A. A. WEBBER.
CORN HARVESTING MACHINE.
APPLICATION FILED MAY 6, 1912.
1,097,693.
Patented May 26, 1914.
3 SHEETS—SHEET 2.
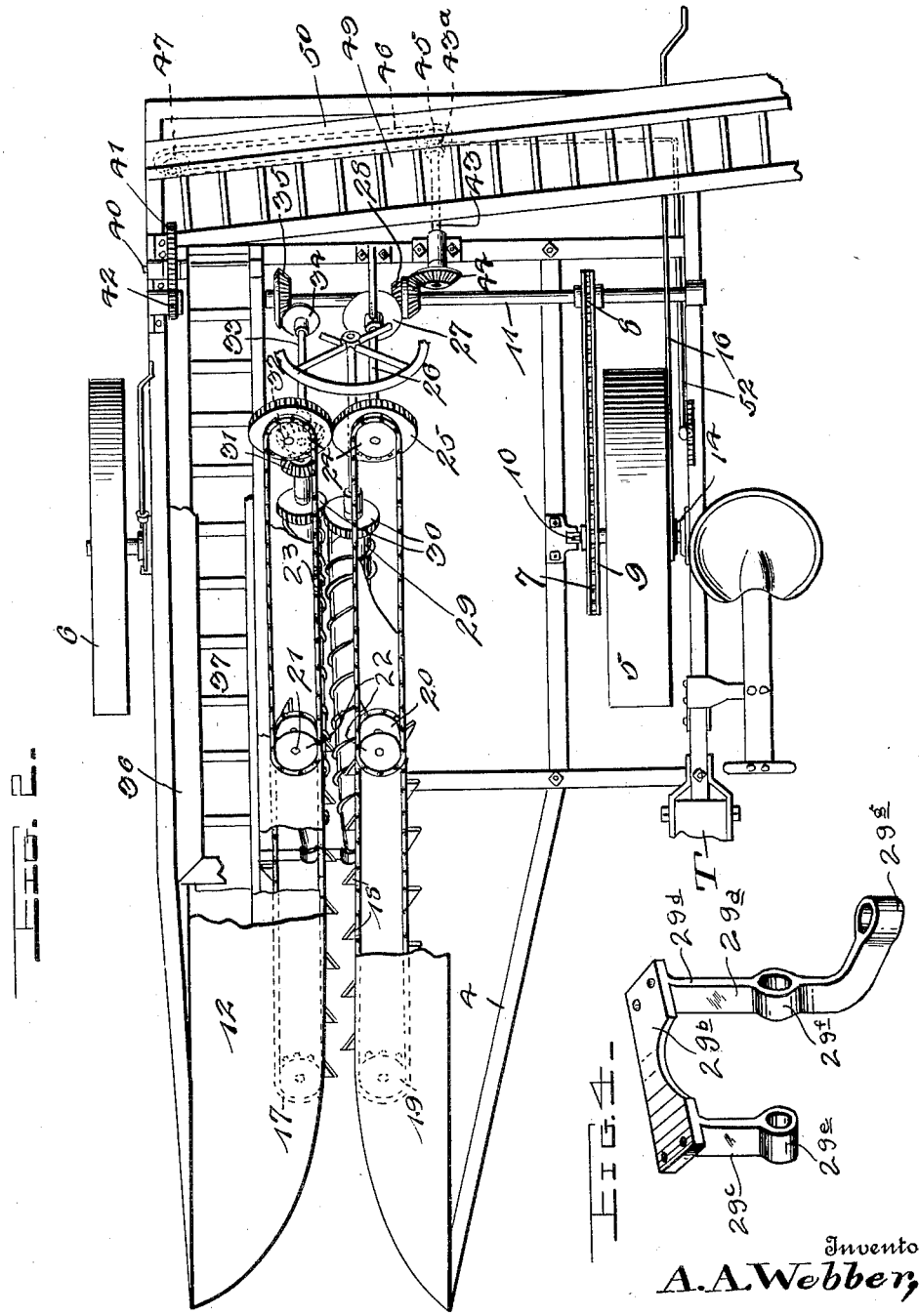
Witnesses
Chas. L. Griestauer
A. B. Norton.
Inventor
A. A. Webber,
By Watson E. Coleman
Attorney A. A. WEBBER.
CORN HARVESTING MACHINE.
APPLICATION FILED MAY 6, 1912.
1,097,693.
Patented May 26, 1914.
3 SHEETS—SHEET 3.
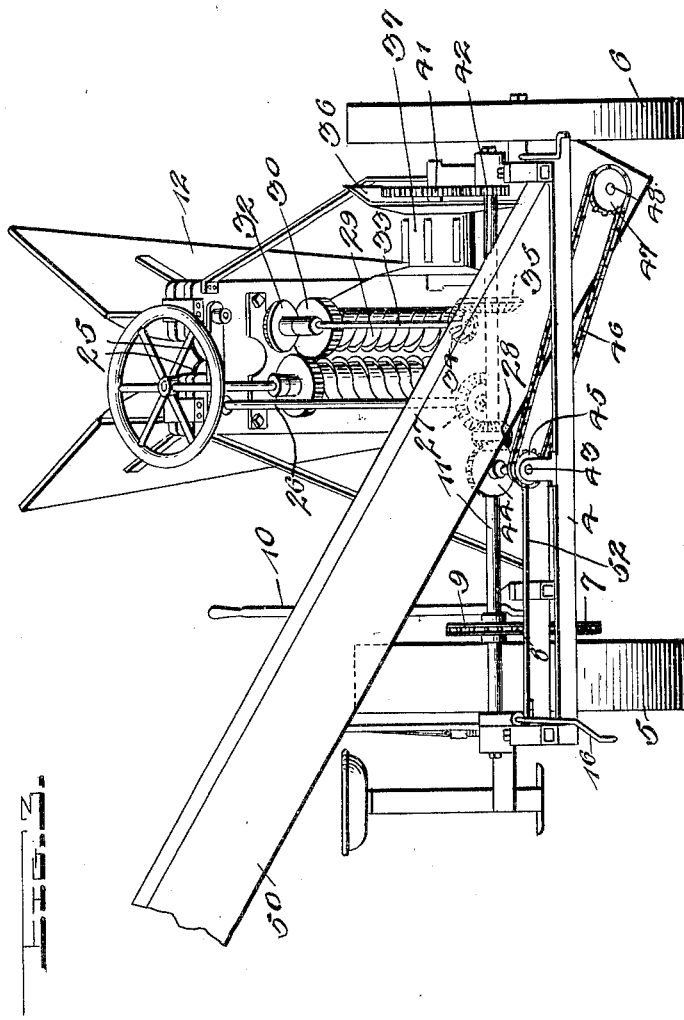
Witnesses
Chas. L. Griesbauer
A. B. Norton.
Inventor
A. A. Webber,
By Watson E. Coleman
Attorney

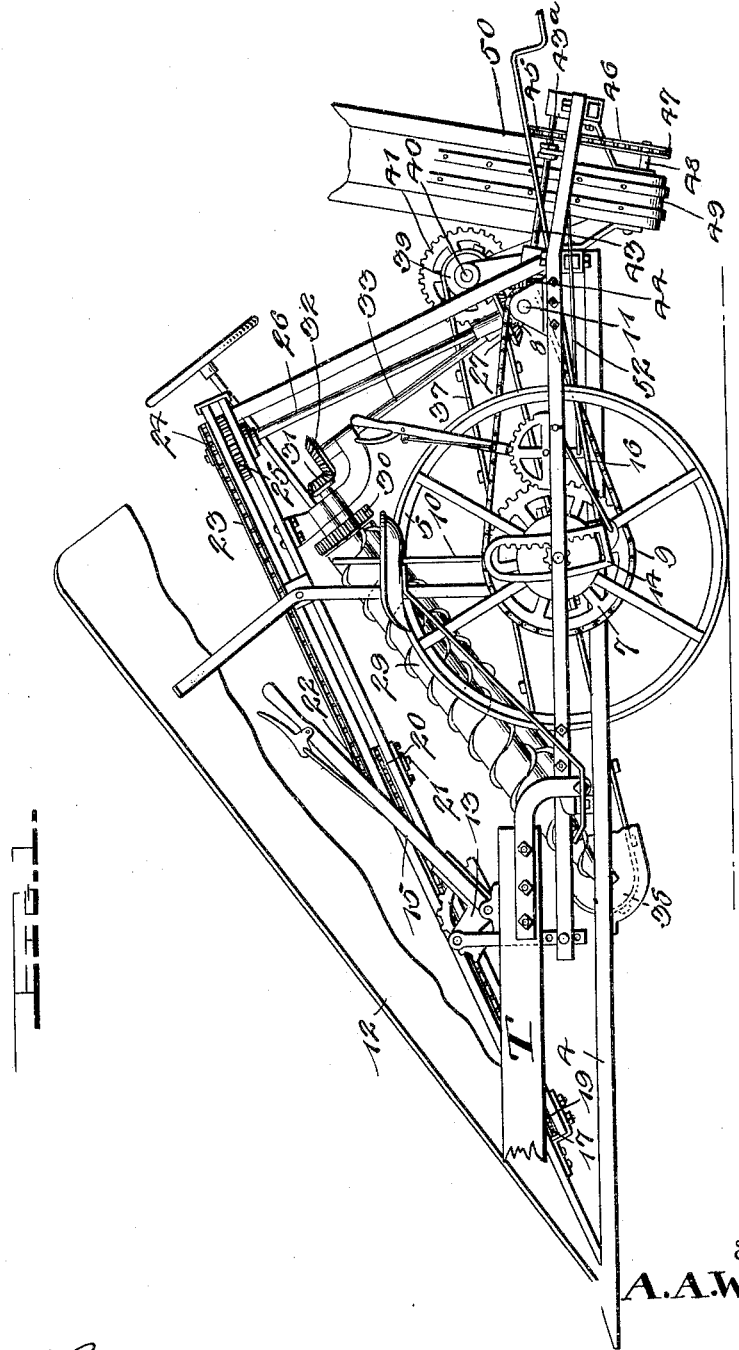

UNITED STATES PATENT OFFICE.

ALLIE A. WEBBER, OF CASTLETON, ILLINOIS.

CORN-HARVESTING MACHINE.

1,097,693. Specification of Letters Patent. Patented May 26, 1914.

Application filed May 6, 1912. Serial No. 695,467.

*To all whom it may concern:*

Be it known that I, ALLIE A. WEBBER, a citizen of the United States, residing at Castleton, in the county of Stark and State of Illinois, have invented certain new and useful Improvements in Corn-Harvesting Machines, of which the following is a specification, reference being had to the accompanying drawings.

This invention relates to improvements in corn harvesting machines, the primary object being to provide a machine for this purpose wherein are combined the features of lightness of draft, simplicity of construction and compactness in the arrangement of the several elements employed, thereby conducing to durability in practical use and comparatively low cost of manufacture.

Another object of the invention is to provide a corn harvesting machine which is particularly designed with a view to prevent the shelling of the corn from the cob when the same is removed or picked from the standing stalk, and also during the movement of the corn through the machine to its point of discharge.

A still further object of the invention resides in the provision of a corn harvesting machine embodying in its combination rotary harvesting rollers to detach the corn from the stalk, and a conveyer to receive the corn, said rollers being so mounted and arranged with relation to each other that they direct the corn upon the conveyer in their rotary movement.

With the above and other objects in view the invention consists in the novel features of construction and in the combination and arrangement of the parts hereinafter more fully described, pointed out in the claim and shown in the accompanying drawings, in which—

Figure 1 is a side elevation of a corn harvesting machine embodying the present invention; Fig. 2 is a top plan view; Fig. 3 is a rear end elevation. Fig. 4 is a detail perspective view of the hanger bearing member.

In corn harvesting machines of that type wherein spirally ribbed rollers are employed to remove the corn from the standing stalks, it has been found that a considerable part of the corn, is shelled from the cob as the rollers remove the husk from the corn in their rotary movement. It is also a well known fact that corn to be used for cattle feeding is too concentrated in itself and must therefore be mixed with hay or other fodder. The present invention is designed to overcome the loss of the corn as above noted and also to harvest the ears of corn with part of the husk still remaining thereon so that the same will serve as a proper cattle food without requiring the mixture of other fodder therewith. I accomplish these ends by means of the improved mechanism which I will now proceed to set forth in detail.

As best shown in Fig. 1 of the drawings a frame 4 is provided, said frame being mounted to oscillate upon the stub axles upon which the supporting wheels 5 and 6 respectively are mounted. From the bull wheel 5 the various harvesting and conveying mechanisms are primarily actuated. Power is transmitted from the sprocket wheel 7 loosely mounted upon the wheel axle through the medium of the chain 9 which traverses said sprocket and a similar sprocket 8 keyed to the transverse shaft 11 which is mounted in suitable bearings on the frame 4. A sliding clutch member is keyed upon the wheel axle and is adapted to be shifted by means of a lever 10 into engagement with clutch teeth provided on the sprocket 7 so that the operating mechanism which is driven by the shaft 11 may be thrown into or out of operation at the will of the operator.

Upon the machine frame the usual inclined guide boards 12 for the grain stalks are mounted. The lower forward ends of these guide boards have their inner edges divergently disposed to form a flaring mouth in which the grain stalk is received in the movement of the machine. A familiar type of tilting device generally indicated by the numeral 13 is mounted upon the tongue T to tilt the frame of the machine upon the wheel axle and dispose the lower ends of the guide boards 12 with relation to the ground so that said boards will assist in picking up the wind blown or down fallen stalks. A raising and lowering device indicated at 14 is also provided to coöperate with the tilting device and assist the same in the accomplishment of the above function. This latter device is quite common in the art, being usually employed upon all self binding harvesters. The tilting device is actuated by means of a suitable lever 15 while the lowering and raising device is controlled by means of the crank 16.

Upon a suitable support arranged beneath the guide boards 12, the directing chains 17 are provided, said chains carrying lugs or fingers 18 to engage the corn stalks and assist in directing the same to the spirally ribbed stripping or harvesting rollers to be later referred to. These chains traverse the lower and upper sprockets 19 and 20 respectively, the latter sprockets being keyed to the shafts 21 to which shafts the sprockets 22 are also secured. Chains 23 traverse the latter sprockets and extend around the sprockets 24 one of which is fixed upon the upper end of the inclined shaft 26. With the sprockets 24 the spur gears 25 are integrally formed, and it will therefore be seen that when the actuating shaft 26 is rotated movement is imparted through the medium of the meshing gears 25 to the chains 23 in opposite directions around their respective sprockets. The actuating shaft 26 is provided with a beveled gear 27 on its lower end which meshes with a double beveled gear 28 keyed to the transverse shaft 11.

The stripping or harvesting rollers 29 above referred to are arranged beneath the directing chains 17 and the chains 23 and disposed at an angle with relation thereto. As will be noted from reference to Fig. 1 said rollers are positioned at an angle of substantially 45 degrees with relation to the frame of the machine. These rollers are provided with spiral peripheral ribs extending therearound in relatively opposite directions. The longitudinal axes of the rollers are disposed in parallel relation but the axis of one roller is disposed below that of the other roller for a purpose which will be apparent from the following description. These rollers are journaled at their lower ends in suitable bearings provided on the frame of the machine and have trunnions on their upper ends mounted in a support or hanger 29$^a$. This hanger includes the attaching plate 29$^b$ which is provided with openings at its ends to receive suitable fastening bolts and the spaced arms 29$^c$ and 29$^d$ formed upon opposite ends of said plate but projecting in the same direction therefrom. The arm 29$^c$ is provided upon its end with a bearing 29$^e$ to receive the shaft of one of the rollers 29. The other arm 29$^d$ is also provided intermediate of its ends with a bearing 29$^f$ to receive the shaft of the other roller. The lower end of this latter arm is extended at substantially right angles to the upper portion thereof and is provided upon its extremity with a bearing 29$^g$, the major axis of which is disposed in a plane at substantially right angles to the corresponding axis of the bearing 29$^f$. The bearing 29$^g$ is adapted to receive the upper end of the operating shaft 33. To these trunnions the spur gears 30 are fixed, said gears meshing with each other to impart rotary movement to the rollers in relatively opposite directions. A beveled gear 31 is keyed to one of the roller trunnions and meshes with the larger beveled gear 32 on the upper end of the inclined shaft 33 which is provided on its lower end with a gear 34 to mesh with an actuating gear 35 keyed upon the shaft 11.

A longitudinally extending conveyer apron 37 is mounted in the machine frame adjacent and beneath the lowermost harvesting roller 29. This conveyer is supported for movement around the rollers 38 and 39 at the front and rear ends of the machine. The latter roller is positively driven to impart motion to the conveyer. For this purpose the gear 41 is keyed to the roller shaft 40 and meshes with the gear 42 keyed upon the main driving shaft 11.

A short longitudinally disposed shaft 43 is mounted in the rear end of the frame 4 and is provided on one end with a gear 44 to mesh with the double gear 28 on the shaft 11. A sprocket wheel 45 is loosely mounted upon the shaft 43 and is traversed by a chain 46 which extends around a smaller sprocket wheel 47 keyed upon the shaft 48 of a roller over which an endless conveyer 49 arranged in the elevator casing 50 moves. A similar roller is of course also provided at the upper end of the elevator casing. A sliding clutch member 43$^a$ is keyed on the shaft 43 to engage a clutch face provided on the sprocket 45 whereby said sprocket may be secured upon the shaft to rotate therewith. Suitable lever actuated means generally indicated by the numeral 52 is provided whereby this clutch may be shifted from the operator's seat to instantly discontinue the elevation of the corn when desired.

From the above description it is believed that the construction and manner of operation of my improved harvesting machine will be clearly understood. As the machine moves over the field, the stalks are successively directed by the boards 12 into engagement with the rearwardly moving fingers 18 on the chains 17, which fingers serve to direct and retain the stalks in position between the oppositely rotating rollers 29. The ribs on these rollers engaging the stalks remove the ears of corn therefrom without tearing the husk completely from the same so that the corn with a portion of the husk remaining thereon is directed by the lowermost rotating roller 29 upon the longitudinally extending conveyer 37. This conveyer carries the corn rearwardly and discharges the same into the boot or lower end of the elevator 50 where it is received upon the conveyer 49 and carried to the upper end of the elevator from which point it is discharged into a rack or wagon which is driven alongside of the machine in its movement across the field. It will be noticed that the elevator 50 is slightly inclined rearwardly from the perpendicular and is arranged in the rear downwardly bent end portion of the frame 4 as shown in Fig. 1. Thus when the forward end of the guide members 12 are lowered by tilting the frame of the machine, the elevator will be disposed substantially in a perpendicular plane.

As comparatively few elements are employed in the construction of my improved corn harvester, it will be obvious that the same is extremely strong and durable in practical use, may be inexpensively manufactured and is highly efficient in operation. While I have shown and described the preferred form and construction of the several parts, it will be understood that the invention is susceptible of considerable modification without departing from the essential features or sacrificing any of the advantages thereof.

What I claim is:—

The combination with a corn harvesting machine including a frame, snapping rollers geared to each other and mounted in said frame, and an operating shaft for said rollers; of a common hanger bearing for said rollers including a single attaching plate secured to the frame and provided with spaced integral arms projecting in parallel relation to each other from said plate, one of said arms being of greater length than the other and having an angularly disposed end portion provided with a bearing sleeve, the extremity of the shorter arm being also provided with a bearing sleeve, said longer arm being provided with an additional sleeve intermediate of its ends, said latter sleeve and the sleeve on the end of the shorter arm receiving the shafts of the respective snapping rollers, the operating shaft being mounted in the bearing sleeve on the extremity of the longer arm, and power transmission gears on the end of the operating shaft and the shaft of one of the snapping rollers.

In testimony whereof I hereunto affix my signature in the presence of two witnesses.

ALLIE A. WEBBER.

Witnesses:
Wm. S. King,
W. A. Smith.

---

Copies of this patent may be obtained for five cents each, by addressing the "Commissioner of Patents, Washington, D. C."